(12) United States Patent
Kapadia et al.

(10) Patent No.: US 10,992,636 B2
(45) Date of Patent: Apr. 27, 2021

(54) MITIGATING NETWORK/HARDWARE ADDRESS EXPLOSION IN NETWORK DEVICES

(71) Applicant: Cisco Technology, Inc., San Jose, CA (US)

(72) Inventors: Shyam N. Kapadia, San Jose, CA (US); Padmanabhan Krishnan, Fremont, CA (US); Naoshad Mehta, San Jose, CA (US); Rajesh B. Nataraja, Sunnyvale, CA (US); Nilesh Shah, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 195 days.

(21) Appl. No.: 15/719,749

(22) Filed: Sep. 29, 2017

(65) Prior Publication Data

US 2019/0104104 A1    Apr. 4, 2019

(51) Int. Cl.
*H04L 29/12* (2006.01)

(52) U.S. Cl.
CPC ........ *H04L 61/2007* (2013.01); *H04L 61/103* (2013.01); *H04L 61/2046* (2013.01); *H04L 61/6022* (2013.01); *H04L 61/6009* (2013.01)

(58) Field of Classification Search
CPC .............. H04L 61/2007; H04L 61/103; H04L 61/2046; H04L 61/6022; H04L 61/6009; H04L 61/2592; H04L 61/2038; H04L 12/4633; H04L 12/4641; H04L 45/74; H04L 45/586; H04L 45/72; H04L 45/66; H04L 45/745; H04L 45/741; H04L 49/70; H04L 49/00; H04L 49/3009; H04L 49/354; H04L 41/0803; H04L 63/0272; G06F 9/45558; G06F 2009/45595; G06F 2212/657; G06F 12/1036
See application file for complete search history.

(56) References Cited

U.S. PATENT DOCUMENTS

| 8,937,955 | B2 | 1/2015 | Ramesh et al. |
| 9,116,727 | B2 | 8/2015 | Benny et al. |
| 9,270,590 | B2 | 2/2016 | A K et al. |
| 9,407,599 | B2 | 8/2016 | Koponen et al. |
| 9,515,930 | B2 | 12/2016 | Devireddy et al. |
| 10,511,458 | B2 * | 12/2019 | Subramaniyam ... H04L 12/4641 |

(Continued)

*Primary Examiner* — Glenton B Burgess
*Assistant Examiner* — Rachel J Hackenberg
(74) *Attorney, Agent, or Firm* — Edell, Shapiro & Finnan, LLC (57) ABSTRACT

A source host device masks the hardware address of a hosted container from a network device to mitigate the use of resources in the network device. A virtual switch on the source host receives a frame from a hosted container. The frame includes a source hardware address of the hardware address corresponding to the hosted container. The frame also includes a source network address of the network address corresponding to the hosted container. The virtual switch replaces the source hardware address of the frame with the hardware address associated with the source host, and send the frame to the network device. The frame sent to the network device includes the host hardware address as the source hardware address and the container network address as the source network address.

20 Claims, 7 Drawing Sheets

(56) References Cited

U.S. PATENT DOCUMENTS

| | | | |
|---|---|---|---|
| 2011/0299537 A1* | 12/2011 | Saraiya | H04L 69/324 |
| | | | 370/392 |
| 2013/0308641 A1* | 11/2013 | Ackley | H04L 61/103 |
| | | | 370/392 |
| 2015/0124821 A1 | 5/2015 | Chu et al. | |
| 2016/0036703 A1* | 2/2016 | Josyula | H04L 45/66 |
| | | | 370/392 |
| 2016/0218972 A1* | 7/2016 | Sun | H04L 45/74 |
| 2018/0241610 A1* | 8/2018 | Wang | H04L 12/4633 |
| 2019/0007364 A1* | 1/2019 | Wang | H04L 61/103 |
| 2019/0028426 A1* | 1/2019 | Holbrook | H04L 61/2007 |
| 2019/0319883 A1* | 10/2019 | Zhou | H04L 45/32 |

* cited by examiner

MITIGATING NETWORK/HARDWARE ADDRESS EXPLOSION IN NETWORK DEVICES

TECHNICAL FIELD

The present disclosure relates to computer networking.

BACKGROUND

In computing systems, containers provide a lightweight package for software to be implemented in a consistent, repeatable format. Multiple containers on a single host device share the host's operating system kernel, but are otherwise completely separated from each other. In comparison to virtual machines running on the same host device, containers running on the same host device take up less space and can be deployed significantly faster. The proliferation of containers, each with a separate hardware address (e.g., Media Access Control (MAC) address), may lead to a significant increase in networking resources, such as binding hardware addresses with network addresses (e.g., Internet Protocol (IP) addresses).

As software containers are more widely adopted, the scale for container workload on a host device may vastly outstrip that of virtual machines (VMs). This may lead to a significant increase in the number of IP/MAC bindings on every port of the network devices connecting the host devices. Using typical Layer2/Layer3 solutions in which all IP/MAC bindings are stored in every network switch (at least in every edge switch), the hardware MAC address scale will not scale to address the storage of all the IP/MAC bindings.

Native container networking includes both Layer 2 and Layer 3 networking, though the attached network fabric may only act as a Layer 2 fabric. Solutions that expose all of the MAC addresses of the containers to the fabric burden the Layer 2 table of the network devices. Other solutions may eliminate the MAC table explosion by assigning the same MAC address to all containers, but with a different IP address. However, distributing routes and performing Layer 3 forwarding on the operating system kernel may place too high of a burden on the host devices to scale adequately.

Specialized hardware has been developed to distribute routes and perform Layer 3 forwarding. This enables the Layer 3 route distribution and forwarding to be offloaded to the hardware network switches. However, when the Layer 3 IP (/32 or /128) addresses are directly exposed to the physical network, the IP table in the network devices does not scale adequately, since the host (/32 or /128) addresses have to be distributed across the network fabric.

DESCRIPTION OF EXAMPLE EMBODIMENTS

Overview

In one embodiment, a computer-implemented method is provided for a first computing device to mask the hardware address of a first container from a network device to mitigate the use of resources in the network device. The method includes, at a virtual switch on the first computing device associated with a first host address, receiving a frame from a first container hosted on the first computing device. The frame includes a source hardware address of the first container hardware address corresponding to the first container. The frame also includes a source network address of a first container network address corresponding to the first container. The method also includes replacing the source hardware address of the frame with the first host hardware address. The first computing device then sends the frame to the network device. The frame sent to the network device includes the first host hardware address as the source hardware address. This frame also includes the first container network address as the source network address.

In another embodiment, a computer-implemented method is provided for a second computing device to direct a frame received from a first container hosted on a first computing device to a second container hosted on the second computing device. The method includes, at a virtual switch on the second computing device associated with a second host address, receiving a frame from a network device. The frame originated from a first container hosted on a first computing device and includes a destination hardware address of a second host hardware address corresponding to the second computing device. The frame also includes a destination network address of a second container network address corresponding to the second container. The method also includes determining a second container hardware address based on the second container network address. The method further includes replacing the destination hardware address of the frame with the second container hardware address. The virtual switch on the second computing device then sends the frame to the second container. The frame sent to the second container includes the second container hardware address as the destination hardware address. This frame also includes the second container network address as the destination network address.

DETAILED DESCRIPTION

The Layer2/Layer3 tables of physical network switches do not scale efficiently in the face of increased container workload. Enterprises may prefer to have visibility into all of their workloads, requiring similar handling of VM, bare metal, and container workloads. Network Address Translation (NAT) may not be the preferred option for maintaining the visibility into all of the workloads. In this way, each container will have an IP address and MAC address that uniquely identifies that endpoint within the network. Having a centralized gateway approach where all of the IP/MAC entries (e.g., learned from Address Resolution Protocol (ARP) and/or Neighbor Discovery (ND) processes) are stored for all workloads, including containers, does not scale adequately, from either a control plane or a data plane point of view.

A distributed IP gateway option on the access layer (e.g., the Top of Rack (ToR) or leaf layer) does allow the IP/MAC tables to scale. By extending the Layer 2 networking to the host devices, the techniques presented herein ensure that the IP and MAC table scale remains bounded on the network devices. Container workloads may be instantiated by a container orchestrator (or by an equivalent IP Address Management module) that stores all of the container addresses.

In some examples, the subnets employed by the container workloads are not shared with non-container workloads, though non-container workloads may communicate with container workloads using standard routing semantics. The separate subnets for container workloads is typically used for systems in which the container orchestrator is managed by the container network plugins.

Figure 1:
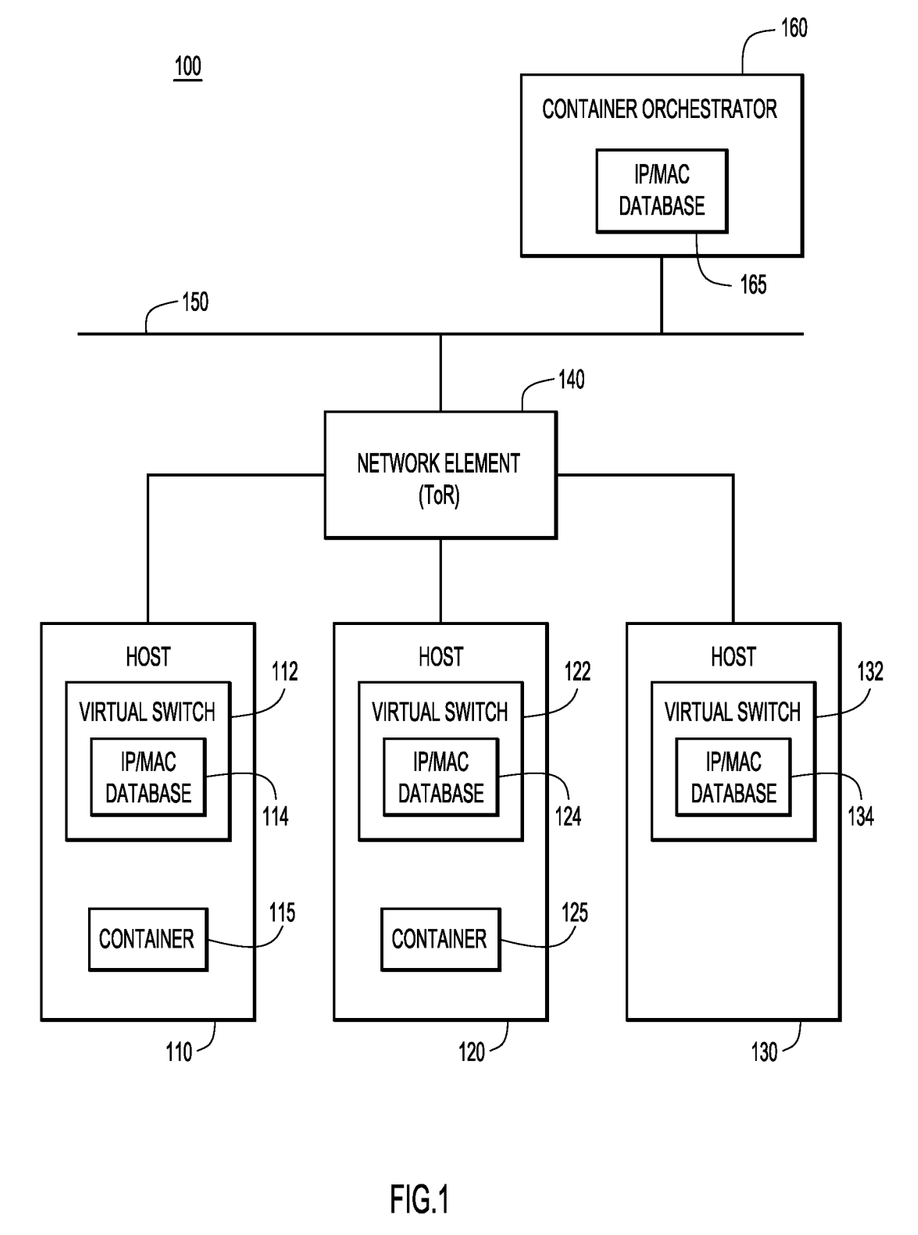
FIG. 1 is a simplified block diagram of a system to manage IP/MAC bindings between networked containers, according to an example embodiment.

Referring now to FIG. 1, a system 100 of network container/hosts includes a host 110 that is running a virtual switch 112 with an IP/MAC address database 114 and a container 115. The system 100 also includes a host 120 that is running a virtual switch 122 with an IP/MAC address database 124 and a container 125. The system 100 further includes a host 130 that is running a virtual switch 132 with an IP/MAC address database 134. Each of the hosts 110, 120, and 130 is connected to a network element 140 of a network fabric 150. A container orchestrator 160 is also connected to the network 150, and may be hosted in one of the host devices 110, 120, or 130. The container orchestrator includes an IP/MAC database 165 that tracks all of the IP addresses and MAC addresses of containers as they are deployed or removed from the system 100.

In one example, the hosts 110, 120, and 130 are physical computing devices (e.g., bare metal servers). Alternatively, one or more of the hosts 110, 120, and/or 130 may be virtual machines that are themselves hosted on a physical computing device. For simplicity, only one container 115 is shown being hosted on the host 110, but more containers may be hosted. Similarly, more containers may be hosted on the host 120 in addition to the container 125.

In another example, the network element 140 may be a leaf node in a Clos network or a Top of Rack (ToR) network device. The network 150 may be configured as a Clos network or any other topology, including consisting of only the network element 140.

To ease the scaling overhead for both Layer 2 and Layer 3 tables in the network element, the virtual switches 112, 122, and 132 in each of the hosts 110, 120, and 130 rewrite elements of the MAC header in frames to/from containers. For instance, the virtual switch 110 rewrites the source MAC address (SMAC) on frames originating from the container 115 and leaving the host 110 toward the network element 140 for East-West bridging and routing communication. The virtual server 112 rewrites the SMAC of the frame from the container 115 to the MAC address of the host 110. Consequently, the MAC tables on the network element 140 only need to scale with the number of host devices, and not the number of containers.

To ensure that the frames reach the correct destination, the virtual switches perform IP address-based lookup on all packets. In this way, any traffic coming from the network element 140 directed to a hosted container will have the destination MAC address (DMAC) rewritten to the actual container MAC address.

Additionally, the virtual switches may process any ARP requests from the containers hosted on the same host. In processing the ARP requests for containers on the same host, the virtual switch will respond with the MAC address of the actual container. For containers on remote hosts, the virtual switch will respond with the IP-MAC binding in which the MAC address corresponds to the remote host's MAC address.

The network element 140 that includes the gateway to the network 150 will also learn the binding between the IP address of the container and the MAC address of the host. The network element 140 may learn this IP-MAC binding either because the network element 140 is requesting the IP-MAC binding or because a container is resolving an ARP request for the gateway on the network element 140. In either scenario, the virtual switch will rewrite the SMAC of the ARP packet originated by the container towards the network element 140 to the MAC address of the host. The virtual switch will also rewrite the Sender's Hardware Address to the MAC address of the host.

In one example, the network element 140 includes a Switch Virtual Interface (SVI) or Integrated Routing and Bridging (IRB) interface that will absorb the ARP request (e.g., redirect or punt it for handling at the software layer). There is typically no need to forward any ARP requests on the network element 140 since the virtual switches on each of the hosts will handle any ARP processing by proxy. Any ARP requests for hosts that are not known will be dropped at the virtual switch.

In another example, the network element 140, as well as other network elements in the network 150 may learn about the IP-MAC bindings of the containers via the ARP process. All containers within the same host that belong to the same Virtual Local Area Network (VLAN) will use the same host MAC address. This alleviates the scaling issue of the adjacency/next-hop table, which holds entries of (Bridge Domain (BD)/VLAN, Next-Hop MAC), since these entries will be shared by containers in the same host. The adjacency/next-hop table only needs to scale with the number of hosts, and not the number of containers within the hosts.

The IP addresses (e.g., /32 address) of the containers may be advertised to the elements of the network 150 using an appropriate mechanism, such as a routing protocol (e.g., Border Gateway Protocol (BGP)), a Council of Oracles Protocol (CooP)-like mechanism (e.g., Application Centric Infrastructure (ACI) or Open Virtual Switch DataBase (OVSDB)), or by using a controller. To alleviate the Layer 3 or Forwarding Information Base (FIB) table scale, not all of the IP addresses advertised (e.g., via BGP) need to be stored in the hardware tables. A network element may store only the IP addresses of locally attached containers, which may be determined via ARP. Remote addresses may be opportunistically allocated based on active conversations learned through a Layer 3 conversational learning scheme.

While the techniques are described herein in the context of IPv4 and ARP, similar techniques may be implemented for IPv6 container workloads with appropriate Neighbor Discovery handling. With IPv6, the increased address space allows the potential for intelligently allocating parts of the 64-bit interface identifier bits such that for every subnet, one can allocate port-local subnets. Containers behind a port may be allocated a free address from the corresponding port-local subnet. In this way, instead of advertising /128 routes between the network elements, only prefixes corresponding to the port-local subnets need to be advertised to maintain container reachability. If containers are removed at a different location, a graceful migration process may retain the old address for a certain period of time and the corresponding /128 route may be advertised from the new network element for older connections. At the same time, a new address may be procured by the container from the port-local subnet of the new network element. By modifying the Domain Name Server record, new connections to the container will only be sent to the new address. After the grace period, the old address is decommissioned and the /128 address advertisement is no longer necessary.

Figure 2:
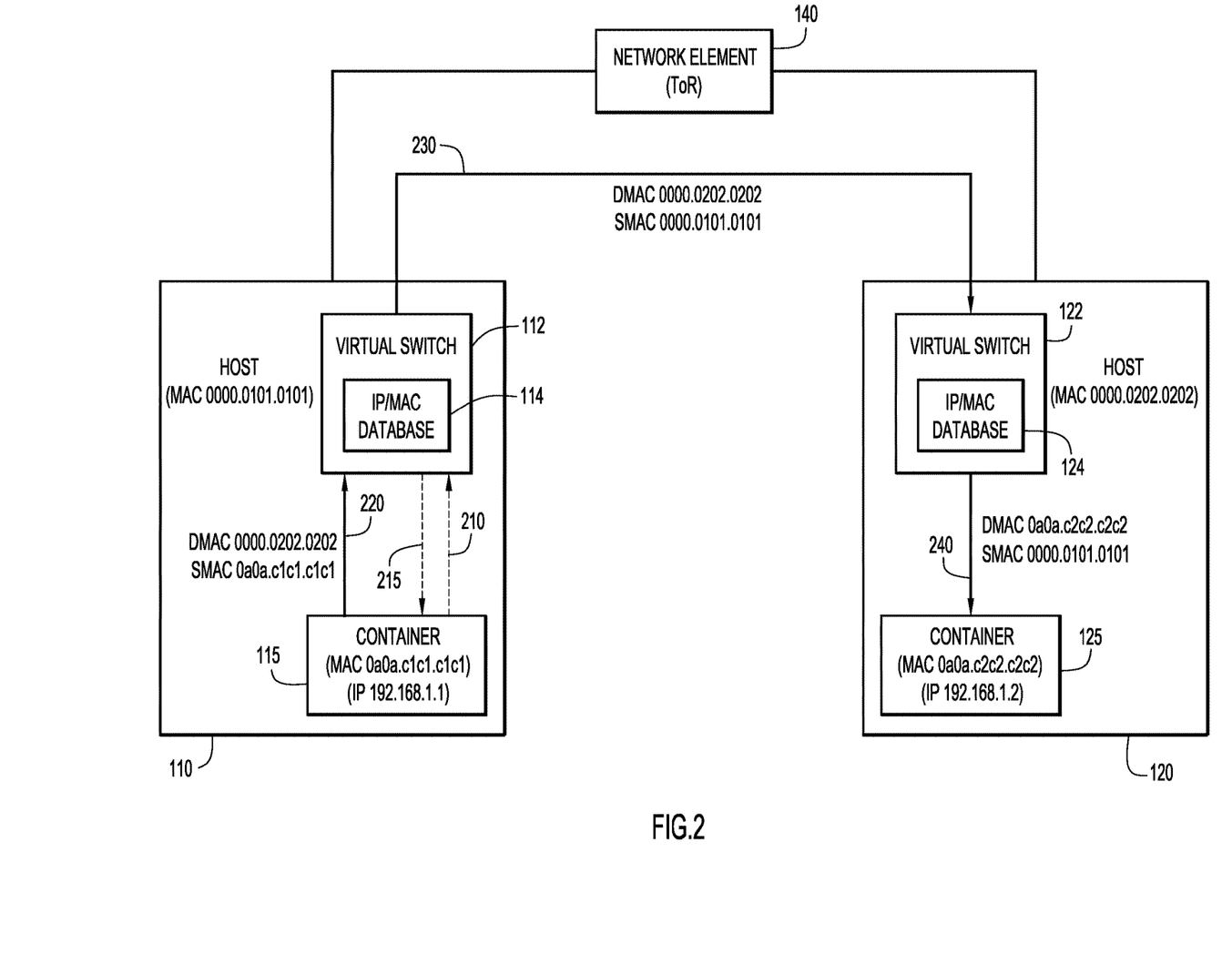
FIG. 2 is a simplified block diagram showing the substitution of source and destination MAC addresses in a frame between two containers hosted on different computing devices, according to an example embodiment.

Referring now to FIG. 2, a simplified block diagram illustrates the operations of the virtual switches 112 and 122 as a container 115 on host 110 communicates with a container 125 on host 120 through the network element 140. In this example, the host 110 has a MAC address (i.e., a hardware address) of 0000.0101.0101. The host 120 has a MAC address of 0000.0202.0202. The source container 115 is hosted on the host 110, and has a MAC address of 0a0a.c1c1.c1c1 and an IP address (i.e., a network address) of 192.168.1.1. The destination container 125 is hosted on the host 120, and has a MAC address of 0a0a.c2c2.c2c2 and an IP address of 192.168.1.2.

Initially, if the source container 115 has not previously stored the MAC address of the destination container 125, then the source container 115 sends an ARP request 210 to determine the MAC address of the destination container 125. The virtual switch 112 intercepts the ARP request 210 and sends a proxy ARP response 215 back to the source container 115. The virtual switch 112 may consult the IP/MAC database 114 to determine the MAC address of the destination container 125 for the proxy ARP response 215. Since the destination container 125 is on a remote host 120, the response MAC address associated with the IP address of the destination container 125 is that of the host 120, i.e., 0000.0202.0202.

Once the source container 115 has a MAC address of the destination container 125, the source container 115 sends a data packet in a frame 220 to the virtual switch 112. The frame 220 includes a DMAC of 0000.0202.0202 (i.e., corresponding to the host 120) and a SMAC of 0a0a.c1c1.c1c1 (i.e., corresponding to the container 115). Since the destination of the frame 220 is a different host (i.e., host 120), the virtual switch 112 rewrites the SMAC of the frame 220 to be the MAC address of the host 110 (i.e., 0000.0101.0101). The virtual switch 112 sends frame 230 with the rewritten SMAC to the network element 140.

The network element 140 forwards the frame 230 to the host 120 based on the DMAC 0000.0202.0202. The network element 140 may also store the IP/MAC bindings that are carried in the frame 230. In this instance, the source IP address 192.168.1.1 of the source container 115 is associated with the MAC address 0000.0101.0101 of the host 110. Similarly, the destination IP address 192.168.1.2 of the destination container 125 is associated with the MAC address 0000.0202.0202 of the destination host 120.

When the host 120 receives the frame 230, the virtual switch 122 queries the IP/MAC database 124 to determine the MAC address associated with the destination IP address 192.168.1.2. The virtual switch 122 replaces the DMAC of the frame 230 with a DMAC corresponding to the MAC address 0a0a.c2c2.c2c2 (i.e., corresponding to the destination container 125). The virtual switch 122 sends the frame 240 with the DMAC 0a0a.c2c2.c2c2 and the SMAC of 0000.0101.0101 to the destination container 125. In one example, the container 125 may associate the SMAC of the frame 240 (i.e., 0000.0101.0101) with the source IP address 192.168.1.1 (i.e., corresponding to the source container 115).

To take care of container migration scenarios in which a container migrates to be hosted on a different host/server in the cluster and maintain the same IP address, the virtual switches will rewrite the DMAC to the new host's MAC address. This ensures that packets directed to the container IP address within the same subnet reach the correct host, even when the source container sends a frame with the original host MAC address as the DMAC. In this way, there is no need to generate gratuitous ARP (GARP) messages of ARP fix-ups to modify the ARP cache of all of the other containers within the same subnet.

Figure 3:
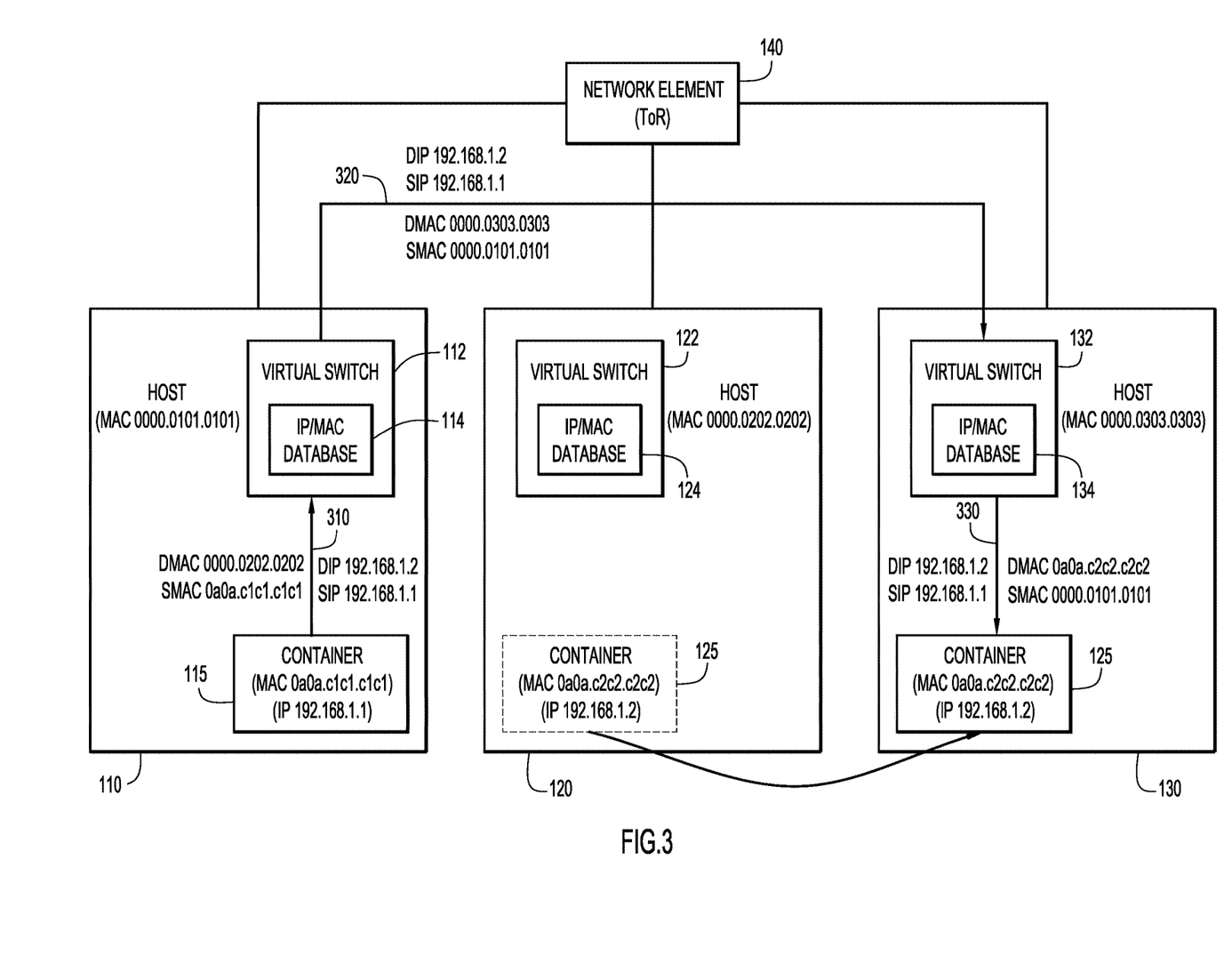
FIG. 3 is a simplified block diagram showing the substitution of source and destination MAC address in a frame directed to a container that has migrated to a new host device, according to an example embodiment.

Referring now to FIG. 3, a simplified block diagram illustrates the operations of the virtual switches 112 and 132 in replacing the MAC addresses of frames directed to containers that have migrated to a different host 130. When the container 125 migrates from the host 120 to the host 130, the container orchestrator 160 (not shown in FIG. 3) updates the IP/MAC databases 114, 124, and 134 in the hosts 110, 120, and 130, respectively, to associate the IP address 192.168.1.2 (i.e., the container IP address) with the MAC address 0000.0303.0303 (i.e., the MAC address of the new host 130).

The source container 115 sends a frame 310 to the container 125, but directs the frame 310 to the old host 120 using the DMAC 0000.0202.0202 (i.e., corresponding to the old host 120). The virtual switch 112 receives the frame 310 and consults the IP/MAC database 114 to determine that the destination IP address (DIP) 192.168.1.2 is associated with a MAC address 0000.0303.0303 (i.e., corresponding to the new host 130). In this case, the virtual switch 112 rewrites the DMAC of the frame 310 to 0000.0303.0303. Additionally, the virtual switch 112 rewrites the SMAC of the frame 310 to 0000.0101.0101, as described with respect to FIG. 2. The virtual switch 112 sends the frame 320 with the rewritten SMAC and DMAC to the network element 140.

The network element 140 forwards the frame 320 to the host 130 based on the DMAC 0000.0303.0303. The network element 140 may also store the updated IP/MAC binding for the migrated container 125. For instance, the IP/MAC binding for the container 125 may be updated to associate the destination IP address 192.168.1.2 of the destination container 125 with the MAC address 0000.0303.0303 of the destination host 130.

When the host 130 receives the frame 320, the virtual switch 132 queries the IP/MAC database 134 to determine the MAC address associated with the destination IP address 192.168.1.2. The virtual switch 132 replaces the DMAC of the frame 320 with a DMAC corresponding to the MAC address 0a0a.c2c2.c2c2 (i.e., corresponding to the destination container 125). The virtual switch 132 sends the frame 330 with the DMAC 0a0a.c2c2.c2c2 and the SMAC of 0000.0101.0101 to the destination container 125.

Figure 4:
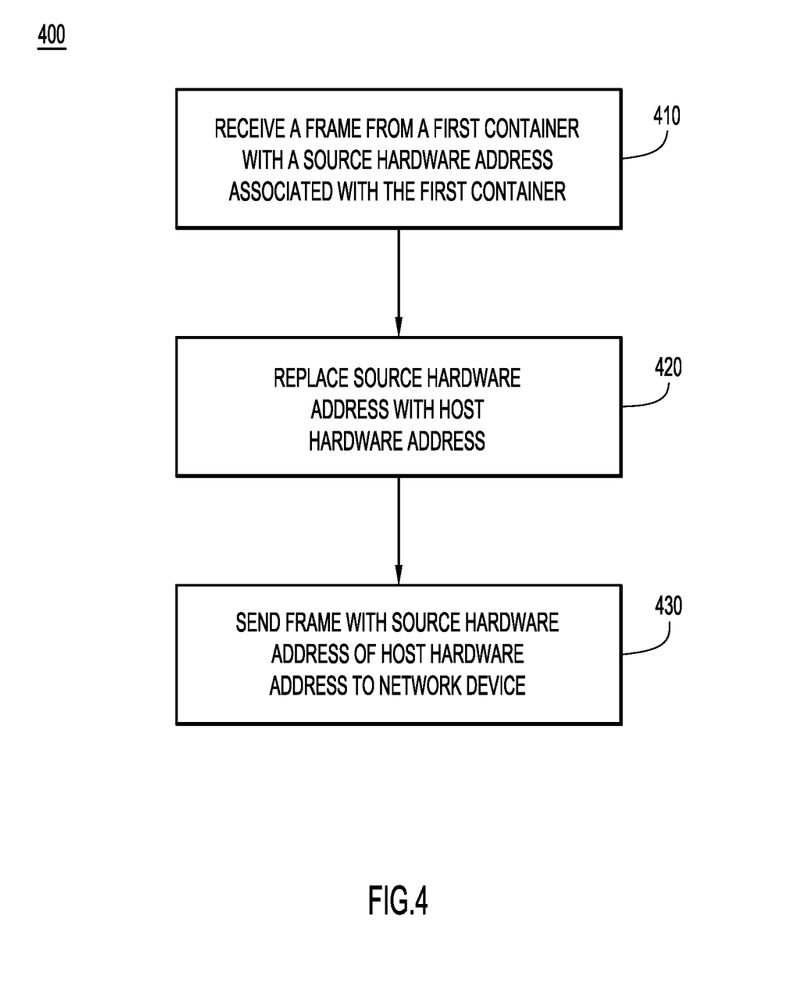
FIG. 4 is a flow chart illustrating the operations performed by a host device in replacing the source hardware address in a frame originating from containers in the host device, according to an example embodiment.

Referring now to FIG. 4, a flow chart is shown that illustrates operations performed by a computing device (e.g., host 110) in a process 400 for mitigating the number of hardware addresses associated with container workloads hosted on the computing device. In step 410, the computing device receives a frame from a first container that is hosted by the computing device. The computing device is associated with a first host hardware address. The frame includes a source hardware address of a first container hardware address corresponding to the first container. The frame also includes a source network address of a first container network address corresponding to the first container. In one example, a virtual switch hosted by the computing device receives the frame from the first container.

In step 420, the computing device (e.g., through the virtual switch) replaces the source hardware address with the first host hardware address associated with the computing device. In step 430, the computing device sends the frame to a network device. The frame that is sent to the network device includes the first host hardware address as the source hardware address of the frame. The frame also includes the first container network address as a source network address of the frame. In one example, the hardware addresses are MAC addresses and the network addresses are IP addresses.

Figure 5:
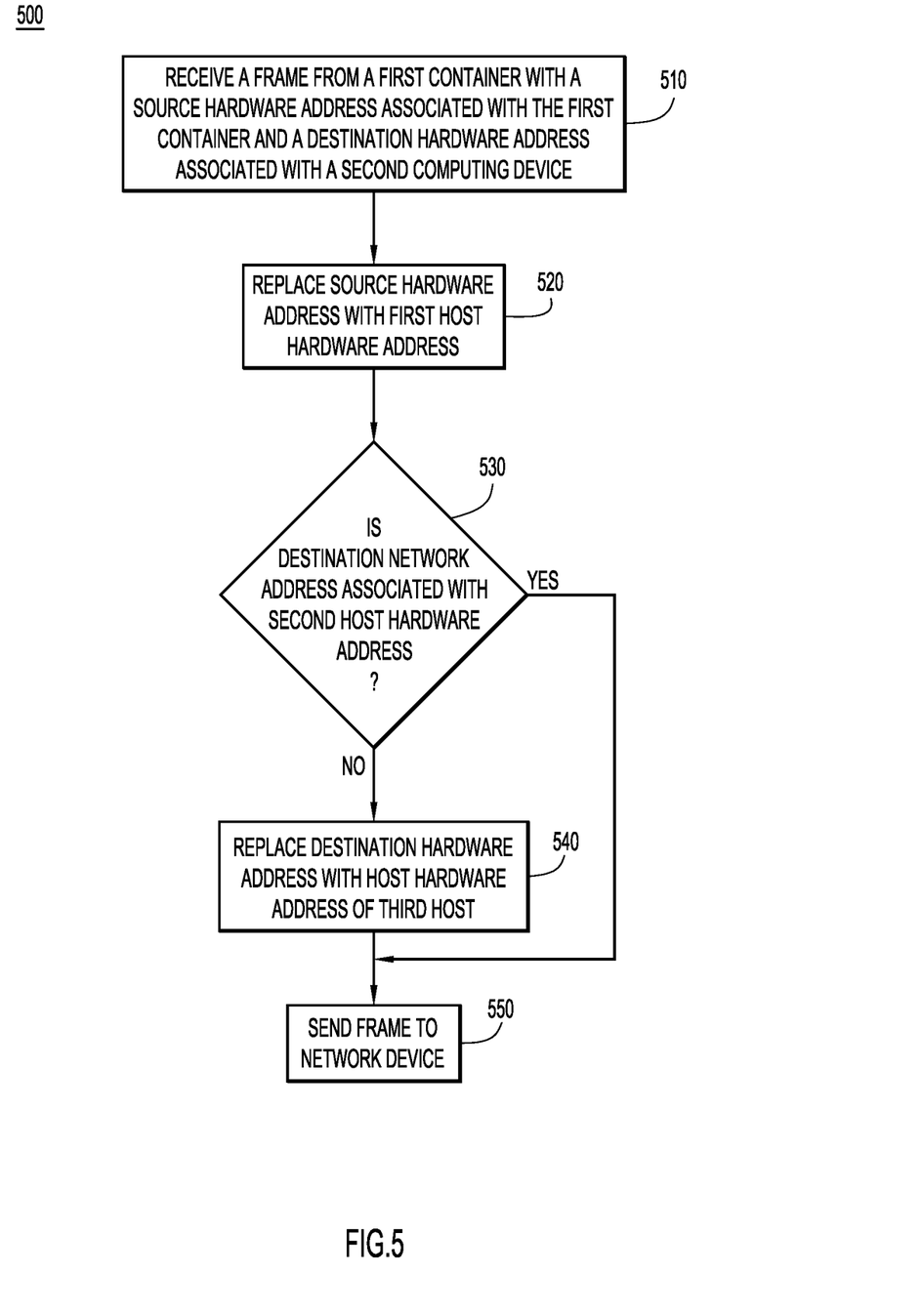
FIG. 5 is a flow chart illustrating the operations performed by a host device in replacing the source hardware address and destination hardware address in a frame originating from containers in the host device and destined for a container that has migrated to a different host device, according to an example embodiment.

Referring now to FIG. 5, a flow chart is shown that illustrates operations performed by a computing device (e.g., host 110) in a process 500 for handling frames directed to a destination container that has migrated to a different host. In step 510, the computing device receives a frame from a first container that is hosted by the computing device. The computing device is associated with a first host hardware address. The frame includes (i) a source hardware address of a first container hardware address corresponding to the first container, (ii) a source network address of a first container network address corresponding to the first container, (iii) a destination hardware address of a second host hardware address corresponding to a second computing device that was hosting a second container, and (iv) a destination network address of a second container network address corresponding to the second container. In one example, a virtual switch hosted by the computing device receives the frame from the first container.

In step 520, the computing device (e.g., through the virtual switch) replaces the source hardware address with the first host hardware address associated with the computing device. The computing device determines if the destination network address (i.e., the second container network address) is associated with the destination hardware address (i.e., the second host hardware address) in step 530. If the second container network address is not associated with the second host hardware address (e.g., the second container has migrated to be hosted on a third computing device), then the computing device replaces the destination hardware address with a third host hardware address in step 540.

In step 550, the computing device sends the frame to a network element. If the second container has not migrated to be hosted on a different computing device, then the frame includes the second host hardware address as the destination hardware address. However, if the second container has migrated to be hosted on the third computing device, then the frame includes the third host hardware address as the destination hardware address. In either case, the frame includes (i) the first host hardware address as the source hardware address, (ii) the first container network address as the source network address, and (iii) the second container network address as the destination address.

Figure 6:
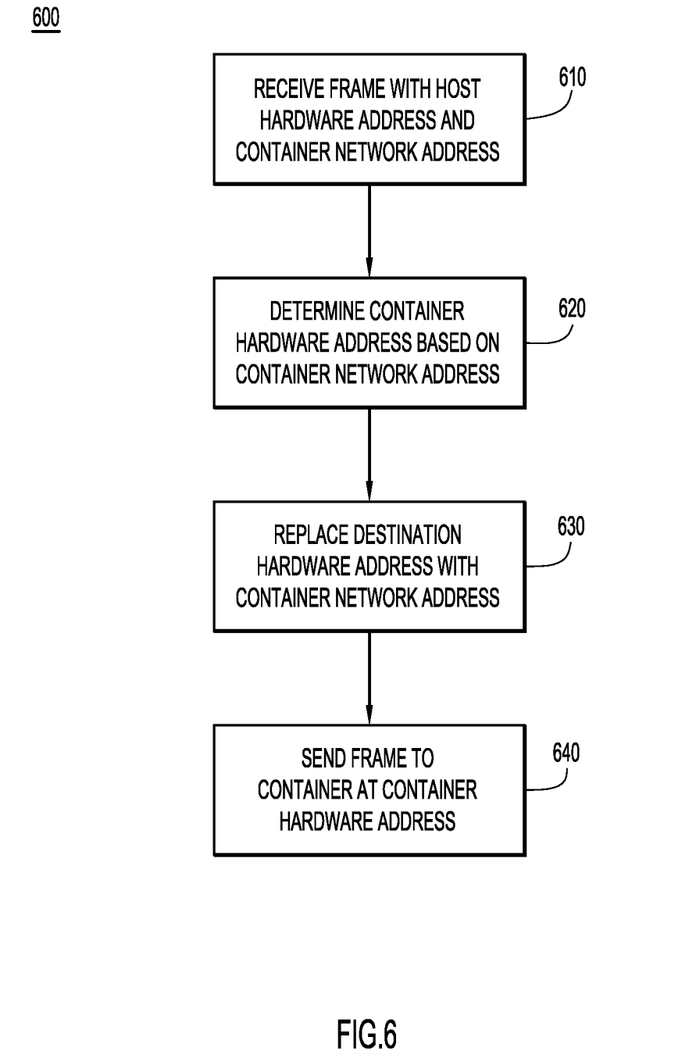
FIG. 6 is a flow chart illustrating the operations performed by a host device in replacing the destination hardware address in frames directed to containers in the host device, according to an example embodiment.

Referring now to FIG. 6, a flow chart is shown that illustrates operations performed by a computing device (e.g., host 120) in a process 600 for directing received frames from a first (remote) container to the appropriate destination at a second container hosted on the computing device. In step 610, the computing device receives a frame from a network element. The frame includes (i) a destination hardware address of the hardware address associated with the computing device, and (ii) a destination network address of the second container network address. In one example, a virtual switch on the computing device receives and processes the frame.

In step 620, the computing device determines the second container hardware address associated with the second container network address. In one example, the computing device queries a database that includes an entry associating the second container network address with the second container hardware address. In step 630, the computing device replaces the destination hardware address of the frame with the second container network address. In step 640, the computing device sends the frame to the second container at the second container hardware address. The frame includes (i) a destination hardware address of the second container hardware address, and (ii) a destination network address of the second container network address.

Figure 7:
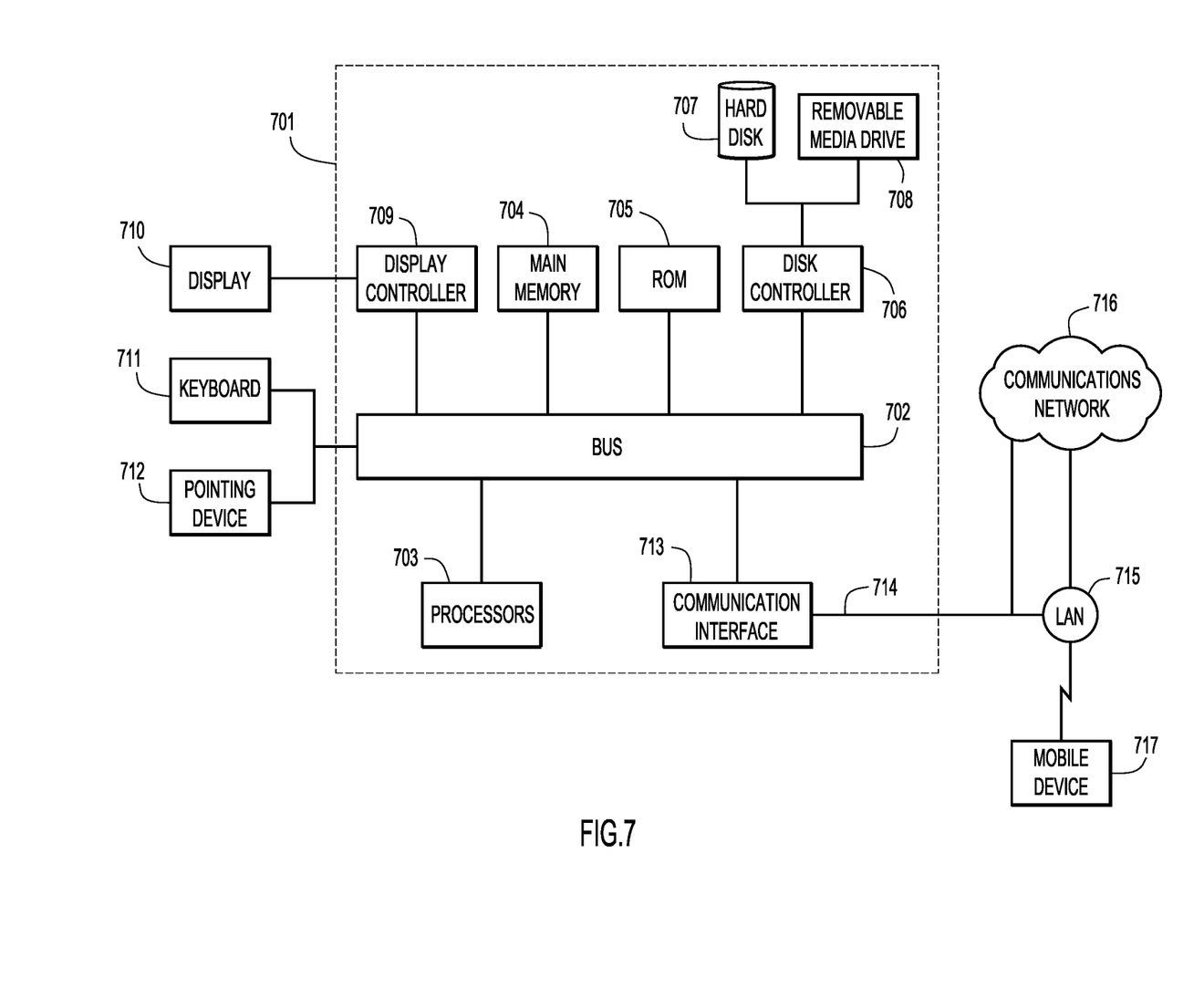
FIG. 7 is a simplified block diagram of a device that may be configured to perform methods presented herein, according to an example embodiment.

Referring now to FIG. 7, an example of a block diagram of a computer system 701 that may be representative of the device 110 in which the embodiments presented may be implemented is shown. The computer system 701 may be programmed to implement a computer based device, such as a host for container workloads. The computer system 701 includes a bus 702 or other communication mechanism for communicating information, and a processor 703 coupled with the bus 702 for processing the information. While the figure shows a single block 703 for a processor, it should be understood that the processors 703 may represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive, solid state drive, etc.). The storage devices may be added to the computer system 501 using an appropriate device interface (e.g., small computer system interface (SCSI), integrated device electronics (IDE), enhanced-IDE (E-IDE), direct memory access (DMA), ultra-DMA, or universal serial bus (USB)).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, include types of processing circuitry. The processing circuitry may be located in one device or distributed across multiple devices.

The computer system 701 may also include a display controller 709 coupled to the bus 702 to control a display 710, such as a cathode ray tube (CRT), liquid crystal display (LCD) or light emitting diode (LED) display, for displaying information to a computer user. The computer system 701 includes input devices, such as a keyboard 711 and a pointing device 712, for interacting with a computer user and providing information to the processor 703. The pointing device 712, for example, may be a mouse, a trackball, track pad, touch screen, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing steps of the operations presented herein in response to the processor 703 executing one or more sequences of one or more instructions contained in a memory, such as the main memory 704. Such instructions may be read into the main memory 704 from another computer readable storage medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable storage medium or memory for holding instructions programmed according to the embodiments presented, for containing data structures, tables, records, or other data described herein. Examples of computer readable storage media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM, DVD), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the operations presented herein, and for enabling the computer system 701 to interact with a human user (e.g., a network administrator). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA), tablet computer, laptop computer, or cellular telephone.

In summary, the techniques presented herein mitigate the IP address and MAC address scale issues caused by large numbers of container workloads for Layer 2 and Layer 3 tables on physical switches. In one example, enhancements to ARP/ND handling on virtual switches and the network elements ensure that ARP/ND traffic is not flooded within the network. Additionally, the Layer 2 MAC tables and Layer 3 next-hop tables scale according to the number of hosts rather than according to the number of containers.

Host-based overlays put a large burden on the host devices, and the overlays cannot match the speed/performance of the specialized routing hardware on the network elements. The techniques presented herein eliminate the Layer 3 forwarding and running routing protocols in the host devices. Typically, Layer 3 forwarding in the host devices is predominantly software-based, and reducing this Layer 3 forwarding enables the operation to scale adequately with increasing numbers of container workloads. The presented techniques limit the size of the host route table required on the network elements, while still offering any-to-any connectivity between container workloads. This eliminates the MAC/IP table explosion in both the network fabric and in the host devices.

In one form, a method is provided for a first computing device to mask the hardware address of a first container from a network device to mitigate the use of resources in the network device. The method includes, at a virtual switch on the first computing device associated with a first host address, receiving a frame from a first container hosted on the first computing device. The frame includes a source hardware address of the first container hardware address corresponding to the first container. The frame also includes a source network address of a first container network address corresponding to the first container. The method also includes replacing the source hardware address of the frame with the first host hardware address. The first computing device then sends the frame to the network device. The frame sent to the network device includes the first host hardware address as the source hardware address. This frame also includes the first container network address as the source network address.

In another form, an apparatus is provided comprising a network interface unit and a processor. The network interface unit is configured to communicate with at least one network device. The processor is configured to host a virtual switch connected to a first container hosted on the apparatus. The processor is also configured to receive a frame from the first container. The frame includes a source hardware address of a first container hardware address corresponding to the first container. The frame also includes a source network address of a first container network address corresponding to the first container. The processor is further configured to replace the source hardware address of the frame with a first host hardware address associated with the apparatus. The processor is configured to cause the network interface unit to send the frame to the network device. The frame sent to the network device includes the first host hardware address as the source hardware address. This frame also includes the first container network address as the source network address.

In a further form, a non-transitory computer readable storage media is provided that is encoded with instructions that, when executed by a processor in a first computing device, cause the processor to host a virtual switch connected to a first container hosted on the first computing device. The instructions cause the processor receive a frame from the first container. The frame includes a source hardware address of the first container hardware address corresponding to the first container. The frame also includes a source network address of a first container network address corresponding to the first container. The instructions further cause the processor to replace the source hardware address of the frame with a first host hardware address associated with the first computing device. The instruction cause the processor to send the frame to a network device. The frame sent to the network device includes the first host hardware address as the source hardware address. This frame also includes the first container network address as the source network address.

In still another form, a method is provided for a second computing device to direct a frame received from a first container hosted on a first computing device to the appropriate container hosted on the second computing device. The method includes, at a virtual switch on the second computing device associated with a second host address, receiving a frame from a network device. The frame originated from a first container hosted on a first computing device and includes a destination hardware address of a second host hardware address corresponding to the second computing device. The frame also includes a destination network address of a second container network address corresponding to the second container. The method also includes determining a second container hardware address based on the second container network address. The method further includes replacing the destination hardware address of the frame with the second container hardware address. The virtual switch on the second computing device then sends the frame to the second container. The frame sent to the second container includes the second container hardware address as the destination hardware address. This frame also includes the second container network address as the destination network address.

In yet another form, an apparatus is provided comprising a network interface unit and a processor. The network interface unit is configured to communicate with at least one network device. The processor is configured to host a virtual switch connected to a second container hosted on the apparatus. The processor is also configured to receive a frame from the network device via the network interface device. The frame includes a destination hardware address of a second host hardware address corresponding to the apparatus. The frame also includes a destination network address of a second container network address corresponding to the second container. The processor is configured to determine a second container hardware address based on the second container network address. The processor is further configured to replace the destination hardware address of the frame with the second container hardware address. The processor is configured to send the frame to the second container. The frame sent to the second container includes the second container hardware address as the destination hardware address. This frame also includes the second container network address as the destination network address.

In a still further form, a non-transitory computer readable storage media is provided that is encoded with instructions that, when executed by a processor in a second computing device, cause the processor to host a virtual switch connected to a second container hosted on the second computing device. The instructions cause the processor receive a frame from a network device. The frame includes a destination hardware address of the second host hardware address corresponding to the second computing device. The frame also includes a destination network address of a second container network address corresponding to the second container. The instructions cause the processor to determine a second container hardware address based on the second container network address. The instructions further cause the processor to replace the destination hardware address of the frame with the second container hardware address. The instruction cause the processor to send the frame to the second container. The frame sent to the second container includes the second container hardware address as the destination hardware address. This frame also includes the second container network address as the destination network address.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   on a first computing device associated with a first host Media Access Control (MAC) address, receiving a frame at a virtual switch from a first container, the virtual switch and the first container hosted on the first computing device, wherein the frame includes a source MAC address of a first container MAC address corresponding to the first container and a source network address of a first container network address corresponding to the first container;
   saving a correlation of the first container MAC address with the first container network address, enabling the virtual switch to bridge a response message directed to the first container network address to the first container, wherein the response message includes the first host MAC address and the first container network address;
   responsive to a determination that the frame includes a destination MAC address that is different than the first host MAC address, replacing the source MAC address of the frame with the first host MAC address; and
   sending the frame to a network device, wherein the frame includes (i) the first host MAC address as the source MAC address and (ii) the first container network address as the source network address.

2. The method of claim 1, further comprising storing a database on the virtual switch, the database including entries correlating a plurality of network addresses with a plurality of MAC addresses, wherein the plurality of network addresses includes the first container network address, and wherein the plurality of MAC addresses includes the first host MAC address and the first container MAC address.

3. The method of claim 2, wherein the plurality of network addresses are a plurality of Internet Protocol (IP) addresses.

4. The method of claim 1, wherein the frame further includes a destination network address and the destination MAC address, wherein the destination network address is a second container network address of a second container hosted on a second computing device and the destination MAC address is a second host MAC address associated with the second computing device.

5. The method of claim 4, further comprising:
   responsive to a determination that the second container has migrated to be hosted on a third computing device associated with a third host MAC address, replacing the destination MAC address of the frame with the third host MAC address.

6. The method of claim 5, further comprising receiving an updated entry for a database correlating the second container network address with the third host MAC address.

7. The method of claim 6, wherein the determination that the second container has migrated to be hosted on the third computing device is based on the updated entry for the database.

8. An apparatus comprising:
   a network interface unit configured to communicate with at least one network device; and
   a processor configured to:
      host a virtual switch connected to a first container hosted on the apparatus;
      receive a frame from the first container, wherein the frame includes a source Media Access Control (MAC) address of a first container MAC address corresponding to the first container and a source network address of a first container network address corresponding to the first container;
      save a correlation of the first container MAC address with the first container network address, enabling the virtual switch to bridge a response message directed to the first container network address to the first container, wherein the response message includes a first host MAC address associated with the apparatus and the first container network address;
      responsive to a determination that the frame includes a destination MAC address that is different than the first host MAC address, replace the source MAC address of the frame with the first host MAC address; and
      cause the network interface unit to send the frame to the network device, wherein the frame includes (i) the source MAC address of the first host MAC address and (ii) the source network address of the first container network address.

9. The apparatus of claim 8, wherein the processor is further configured to store a database including entries correlating a plurality of network addresses with a plurality of MAC addresses, wherein the plurality of network addresses includes the first container network address, and wherein the plurality of MAC addresses includes the first host MAC address and the first container MAC address.

10. The apparatus of claim 9, wherein the plurality of network addresses are a plurality of Internet Protocol (IP) addresses.

11. The apparatus of claim 8, wherein the frame includes a destination network address and the destination MAC address, wherein the destination network address is a second container network address of a second container hosted on a second computing device and the destination MAC address is a second host MAC address associated with the second computing device.

12. The apparatus of claim 11, wherein the processor is further configured to:
   responsive to a determination that the second container has migrated to be hosted on a third computing device associated with a third host MAC address, replacing the destination MAC address of the frame with the third host MAC address.

13. The apparatus of claim 12, wherein the processor is further configured to receive an updated entry for a database correlating the second container network address with the third host MAC address.

14. The apparatus of claim 13, wherein the determination that the second container has migrated to be hosted on the third computing device is based on the updated entry for the database.

15. One or more non-transitory computer readable storage media encoded with computer executable instructions operable to cause a processor in a first computing device to:
   host a virtual switch connected to a first container hosted on the first computing device;
   receive a frame from the first container, wherein the frame includes a source Media Access Control (MAC) address of a first container MAC address corresponding to the first container and a source network address of a first container network address corresponding to the first container;

save a correlation of the first container MAC address with the first container network address, enabling the virtual switch to bridge a response message directed to the first container network address to the first container, wherein the response message includes a first host MAC address associated with the first computing device and the first container network address;

responsive to a determination that the frame includes a destination MAC address that is different than the first host MAC address, replace the source hardware MAC address of the frame with the first host MAC address; and send the frame to a network device, wherein the frame includes (i) the source hardware MAC address of the first host MAC address and (ii) the source network address of the first container network address.

16. The non-transitory computer readable storage media of claim 15, further comprising instructions operable to cause the processor to store a database including entries correlating a plurality of network addresses with a plurality of MAC addresses, wherein the plurality of network addresses includes the first container network address, and wherein the plurality of MAC addresses includes the first host MAC address and the first container MAC address.

17. The non-transitory computer readable storage media of claim 15, wherein the frame includes a destination network address and the destination MAC address, wherein the destination network address is a second container network address of a second container hosted on a second computing device and the destination MAC address is a second host MAC address associated with the second computing device.

18. The non-transitory computer readable storage media of claim 17, further comprising instructions operable to cause the processor to:

responsive to a determination that the second container has migrated to be hosted on a third computing device associated with a third host MAC address, replace the destination MAC address of the frame with the third host MAC address.

19. The non-transitory computer readable storage media of claim 18, further comprising instructions operable to cause the processor to receive an updated entry for a database correlating the second container network address with the third host MAC address.

20. The non-transitory computer readable storage media of claim 19, wherein the determination that the second container has migrated to be hosted on the third computing device is based on the updated entry for the database.

* * * * *